United States Patent [19]

Loren

[11] Patent Number: 5,118,455
[45] Date of Patent: * Jun. 2, 1992

[54] GAS ASSISTED INJECTION MOLDING

[76] Inventor: Norman S. Loren, 24874 Chalk Farm Rd., Warren, Mich. 48091

[*] Notice: The portion of the term of this patent subsequent to Aug. 13, 2008 has been disclaimed.

[21] Appl. No.: 656,205

[22] Filed: Feb. 15, 1991

Related U.S. Application Data

[63] Continuation-in-part of Ser. No. 501,147, Mar. 29, 1990, Pat. No. 5,039,463.

[51] Int. Cl.$^5$ .................. B29C 45/76; B29C 45/78; B29D 22/00
[52] U.S. Cl. .................. 264/40.3; 264/40.6; 264/328.8; 264/328.12; 264/328.13; 264/328.16; 264/572; 425/144; 425/149; 425/546; 425/552; 425/562; 425/567; 425/568; 425/812
[58] Field of Search .......... 264/40.3, 40.6, 237, 264/328.8, 328.12, 328.13, 328.16, 500, 572; 425/135, 143, 144, 149, 546, 547, 552, 562, 567, 568, 812

[56] References Cited

U.S. PATENT DOCUMENTS

| | | | |
|---|---|---|---|
| 4,101,617 | 7/1978 | Friederick | 264/572 |
| 4,740,150 | 4/1988 | Sayer | 425/542 |
| 4,781,554 | 11/1988 | Hendry | 425/4 R |
| 4,824,732 | 4/1989 | Hendry et al. | 428/542.8 |
| 5,039,463 | 8/1991 | Loren | 264/40.3 |
| 5,047,183 | 9/1991 | Eckardt et al. | 264/40.3 |

FOREIGN PATENT DOCUMENTS

| | | |
|---|---|---|
| 0250080 | 12/1987 | European Pat. Off. . |
| 0298635 | 1/1989 | European Pat. Off. . |
| 0309182 | 3/1989 | European Pat. Off. . |
| 0317176 | 5/1989 | European Pat. Off. . |

*Primary Examiner*—Leo B. Tentoni
*Attorney, Agent, or Firm*—Krass & Young

[57] ABSTRACT

A method and apparatus for providing gas assistance in a resin injection molding process of the type in which hot resin is injected into a mold, gas is injected into the mold to displace a portion of the resin in the mold, the resin cools, the gas is vented, and the mold is opened to remove the molded part. The apparatus includes a high pressure gas storage system, a plurality of pressure control assemblies set at varying pressures and interposed between the high pressure gas storage system and the injection nozzle, and a control system which is operative to selectively communicate each of the pressure control assemblies with the injection nozzle so as to allow the delivery of gas at varying pressures to the mold to facilitate the creation of an individualized gas pressure profile to suit the particular molding requirement. The apparatus further includes a supplemental gas storage system including a plurality of gas storage containers interposed between the pressure control assemblies and the injection nozzle so that the supplemental gas storage system may be used in selective cooperation with the pressure control assemblies to provide further versatility with respect to the ability to tailor the pressure profile to the particular molding requirement.

76 Claims, 5 Drawing Sheets

GAS ASSISTED INJECTION MOLDING

RELATED APPLICATION

This application is a continuation-in-part or U.S. Pat. application Ser. No. 501147 filed Mar. 29, 1990, U.S. Pat. No. 5,039,463.

FIELD OF THE INVENTION

This invention relates to injection molding and more particularly to gas assisted injection molding.

BACKGROUND OF THE INVENTION

It is desirable in injection molding to urge the molten thermoplastic resin material into contact with the mold surfaces by exerting pressure on the resin. This aids the external surface of the plastic material in assuming the precise shape dictated by the mold surface. The pressure also assists the filling of the mold space with molten resin even if the space is elongated or narrow and is normally difficult to fill.

In gas assisted injection molding, the articles are produced by injecting molten resin into the mold cavity and injecting a quantity of pressurized gas into the resin to fill out the mold cavity and form a hollow portion in the resin. The gas is preferably an inert gas such, for example, as nitrogen. A pressure is maintained on the gas in the hollow gas space within the resin until the resin has sufficiently set, whereafter the pressurized gas is released from the molded part hollow space and the molded part is removed from the mold cavity.

This gas assisted procedure is advantageous since the molded part produced utilizes somewhat less plastic material and is lighter than if the part were solid plastic. More importantly, the plastic in the gas assisted procedure will not have a tendency to shrink away from the mold walls during cooling since the internal gas pressure will keep it pressed against the walls, thereby minimizing or eliminating surface blemishes such as sink marks. Further, the gas assisted procedure eliminates the need to utilize the screw ram of the injection molding machine to pack out the mold during the molding cycle, thereby minimizing or eliminating molded in stresses in the molded part.

Whereas the gas assisted injection molding process offers many advantages, some of which are enumerated above, as compared to injection molding without gas assistance, the known gas assistance processes incorporate several disadvantages. Specifically, prior art gas assisted processes often involve the use of custom made and expensive apparatus and equipment. Further, the prior art gas assisted processes and apparatus often require the use of pressurized oil to perform one or more steps in the process, with the result that system failure may occur when oil mixes with the nitrogen to contaminate the entire system and necessitate expensive repair to the system and attendant production losses, and with the further result that the times required to perform the oil actuated steps in the process are relatively long. Further, the prior art gas assisted processes and apparatus tend to be single purpose in nature and do not address different molding requirements, resin materials, or applications. Further, the prior art gas assisted processes and apparatus do not provide the precise control of the pressure, time and rate parameters required in the process with the result that the parts produced are often unsatisfactory.

SUMMARY OF THE INVENTION

The present invention is directed to the provision of an improved gas assisted injection molding process and apparatus.

More specifically, the present invention is directed to the provision of a gas assisted injection molding process and apparatus which may be readily and carefully controlled to produce a satisfactory molded part in a wide variety of molding applications and utilizing a wide variety of resin materials.

The invention methodology is directed to providing gas assistance in a resin injection molding process of the type in which hot resin is injected into a mold, gas is injected into the mold to displace a portion of the resin in the mold, the resin cools, the gas is vented, and the mold is opened to remove the molded part.

According to an important feature of the invention, the gas is injected into the mold and the gas pressure within the mold is thereafter increased. This methodology allows the initial gas pressure to be relatively low to displace the resin in the mold so as to prevent the gas from breaking through the resin and yet allows the gas pressure to be increased during or upon the substantial completion of resin displacement in the mold in order to pack the resin tightly and firmly against the mold surface to achieve a quality surface on the molded part.

According to a further feature of the invention methodology, a supply of the injection gas is provided and the gas is injected into the mold at a pressure that is at all times below the pressure of the gas supply. This allows the injection pressure of the gas to be carefully controlled independently of the pressure of the gas supply.

According to a further important feature of the invention methodology, following the initial injection of the gas into the mold and prior to the venting of the gas in the mold, the gas pressure within the mold is selectively increased, decreased or held substantially constant depending upon the particular requirements of the molding process. This selective ability allows virtually unlimited pressure profiles to be configured with respect to the gas pressure within the mold during the resin displacement and cooling portions of the molding cycle so as to enable the creation of a gas pressure profile to suit the particular molding requirement.

According to a further feature of the invention methodology, gas is injected into the mold at an initial pressure to displace a portion of the resin in the mold, the gas pressure is lowered in the mold and, acting at the lower pressure, continues to displace a further portion of the resin in the mold. This methodology allows further refinement with respect to the creation of pressure profiles matching the particular molding application being carried out.

According to a further feature of the invention methodology, the gas pressure is initially delivered to the mold at a relatively constant pressure to displace a portion of the resin before being lowered to a lower pressure to complete the resin displacement portion of the molding cycle. This methodology provides for a relatively high initial breakthrough pressure and a substantially lower pressure to complete the required resin displacement.

According to a further feature of the invention methodology, a desired pressure profile is selected and gas is delivered to the mold in a self-executing manner. The gas may be delivered at a relatively constant pressure, lowered to a lower pressure, and then raised to a higher pressure.

According to a further feature of the invention methodology, gas pressure at a relatively low value is communicated to a gas aperture in communication with the resin in the mold prior to the gas being injected into the mold to displace the resin in the mold. This provision of low pressure gas at the gas aperture precludes inadvertent reverse flow of resin into the gas aperture so as to preclude blockage of the gas aperture during the resin injection process.

According to an important feature of the invention apparatus, the apparatus includes high pressure gas storage means, a plurality of pressure control means set at varying pressures and interposed between the high pressure gas storage means and gas injection means, and means operative to selectively communicate each of the pressure control means with the gas injection means. This arrangement allows the apparatus to selectively deliver gas at varying pressures to the mold so as to facilitate the creation of an individualized gas pressure profile to suit the particular molding requirement.

According to a further feature of the invention apparatus, the gas pressure of the high pressure gas storage means is maintained at a pressure at all times higher than the pressure communicated to the gas injection means. This arrangement allows the pressures within the mold to be individually and selectively manipulated to provide the desired pressure profile independently of the high pressure gas storage pressure.

According to a further feature of the invention apparatus, the apparatus further includes a supplemental gas storage system including at least one storage container interposed between at least one pressure control means and the gas injection means. This arrangement allows the supplemental ga storage system to be used in selective cooperation with the pressure control means to provide further versatility with respect to the ability to tailor the pressure profile to the particular molding requirement.

According to a further feature of the invention apparatus, the apparatus is operative to selectively deliver gas to the gas injection means either directly from one of the pressure control means, bypassing the supplemental gas storage system, or from the gas storage system. This arrangement further refines the ability to construct a pressure profile matching the requirements of the particular molding operation.

According to a further feature of the invention apparatus, the supplemental gas storage system includes a plurality of storage containers of various volumes and control means is operative to selectively communicate each of the storage containers with the gas injection means so as to deliver gas to the mold at the selected pressures depending on the container selected. This arrangement provides further versatility with respect to the creation of a pressure profile matching the requirements of a particular molding operation.

According to a further feature of the invention apparatus, the supplemental gas storage system includes a gas storage container of variable volume. This arrangement allows further refinements with respect to the gas pressure profile by selectively adjusting the volume and pressure of the gas within the variable volume gas storage container.

According to a further feature of the invention apparatus, the apparatus control means are operative to deliver the gas to the mold in a self-executing manner in response to reductions in the gas pressure.

According to a further feature of the invention apparatus, a control means are operative to precharge the supplemental gas storage system to the pressures and volumes desired.

DETAILED DESCRIPTION OF THE PREFERRED EMBODIMENT

The invention gas injection apparatus and methodology is intended for use in association with a gas assisted injection molding process of the type in which hot resin is injected into a mold, gas is injected into the resin to displace a portion of the resin in the mold, the gas is held at a pressure while the resin sets up, the gas is vented from the mold, and the mold is opened to remove the molded part. The gas may be injected into the mold through the same nozzle used to inject the hot resin or, alternatively, may be injected into the mold at a location separate from the interface between the resin nozzle and the mold, for example the sprue, the runner, or directly into the mold cavity.

Figure 1A:
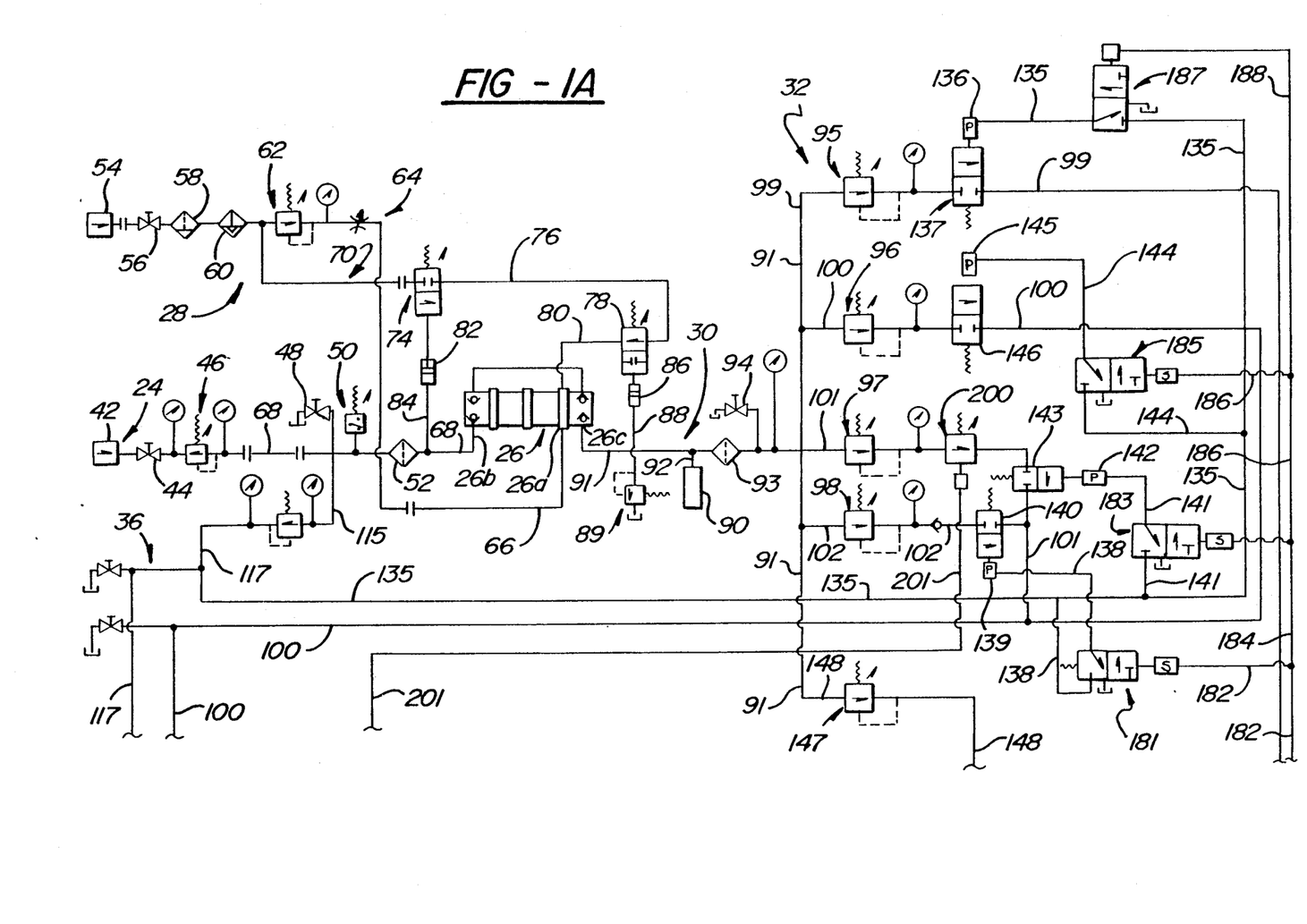
FIGS. 1A and 1B are flow diagrams illustrating the invention method and apparatus.
Figure 1B:
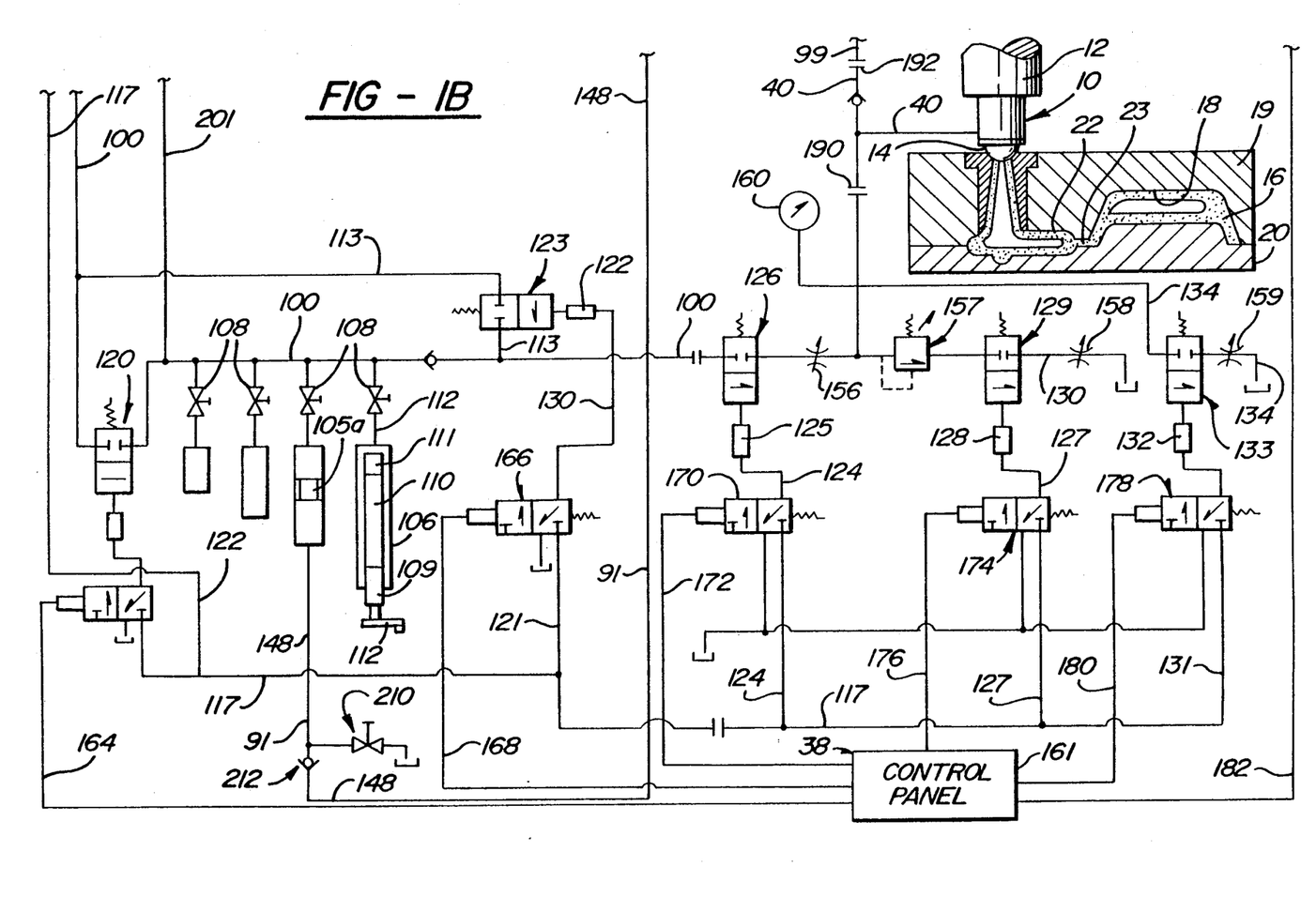

In the method and apparatus illustrated in FIGS. 1A and 1B, the gas is introduced into the mold through the resin injection nozzle. Specifically, the gas is introduced into an injection nozzle 10 connected in known manner to an injection molding machine 12 and including a screw or plunger (not shown) which is actuated in known manner to force resin through nozzle outlet 14 so as to inject a quantity of hot resin 16 into a mold cavity 18 defined, for example, by first and second mold halves 19 and 20 with the resin passing successively through a sprue 21, a runner 22, and a gate 23 into mold cavity 18. The quantity of resin injected is typically a "short shot," i.e., less than the amount required to totally fill the mold cavity 18.

Figure 19:
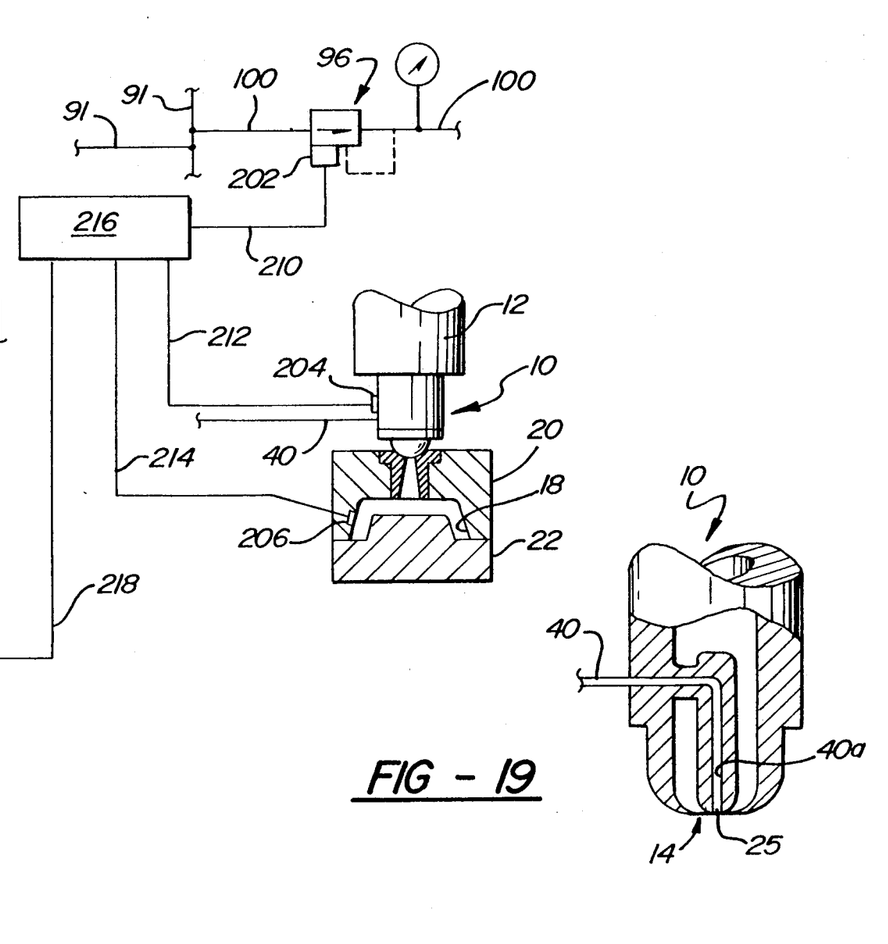
FIG. 19 is a fragmentary detail view of an injection nozzle utilized in the invention apparatus.

Following the introduction of the resin into the mold cavity, and according to known gas assisted molding techniques, pressurized gas is introduced into the mold through a central nozzle aperture 25 (FIG. 19) to fill out the mold cavity with resin. The part to be molded will typically have thicker and thinner portions and the thicker portions will act as an internal runner system to define a flow path for the nitrogen. Since the thicker portions have a significantly higher resin melt temperature, the gas will follow the path of least resistance and the resin material in the thicker portions will continue to flow by virtue of the gas pressure so as to fill out the mold with the resin. Gas pressure is maintained within the mold in the hollow portion of the part until such time as the cooling cycle for the part is sufficient and the resin material has cured, whereafter the gas pressure is suitably vented and the mold is opened to remove the part.

The present invention provides an improved method and apparatus for selectively controlling the gas delivered to the mold with respect to pressures and times in a manner to allow the invention apparatus and methodology to be utilized to produce a superior molded part in a wide variety of molding applications and utilizing a wide variety of resin materials.

The invention apparatus, broadly considered, includes a bulk supply system 24; a booster system 26; a booster drive system 28; a high pressure storage system 30; a pressure control system 32; a supplemental gas storage system 34; a pilot operated gas system 36; an electrical control system 38; and a gas injection conduit 40. Apparatus components 24, 26, 28, 30, 32, 34, 36, 38, and 40 together comprise control means for selectively controlling the gas delivered to the mold with respect to pressure and time.

Bulk supply system 24 comprises a bulk storage container 42, a shut off valve 44, a pressure regulator 46 with associated pressure gages, a shut off valve 48, a pressure switch 50, and a gas filter 52. Container 42 may comprise, for example, a commercial nitrogen bottle storing nitrogen at a nominal pressure of 2500 psi and pressure regulator 46 may be set, for example, to maintain an output pressure of 400 psi. Shut off valve 48 is utilized to vent the supply line for maintenance purposes. Pressure switch 50 is utilized to provide a warning that the bulk supply pressure has fallen near to the maintained output pressure and needs to be replenished.

Booster 26 is an air driven two stage apparatus of known form.

The air to drive booster 26 is provided by booster drive system 28. Booster drive system 28 includes a compressed air supply 54, such, for example, as shop air; a shut off valve 56; a manual drain filter 58; an automatic drain filter 60; a pressure regulator 62 with an associated pressure gage; and a flow control valve 64. Compressed air supply 54 may be maintained at a pressure of 100 psi and pressure regulator 62 may be set to maintain an output pressure of, for example, 80 psi. Regulator air at 80 psi is delivered through flow control valve 64 and conduit 66 to the air inlet 26a of booster 26 so as to drive the booster in known manner and increase the pressure of the nitrogen supplied via conduit 68 from bulk supply system 24 to the inlet 26b of the booster from the 400 psi setting maintained by regulator 46 to, for example, a pressure at booster nitrogen outlet 26c of 12,000 psi.

Booster drive system 28 further includes a pilot air system 70 to shut off the supply of drive air to the booster 26 (utilizing internal booster valve means, not shown) if the output or boost pressure of the booster exceeds a predetermined maximum value (for example 12,000 psi) or if the pressure of the nitrogen gas being delivered to the inlet of the booster from the bulk supply system 24 falls below a predetermined value (for example 400 psi).

Pilot air system 70 includes a conduit 72, a two-way normally closed gas pilot valve 74, a conduit 76, a two-way normally open gas pilot valve 78, and a conduit 80. Valve 74 is actuated by a pilot actuator 82 to an open position. Pilot actuator 82 is in communication with nitrogen from bulk supply 24 via a line 84. Valve 74 includes bias means which are set to close the valve 74 at such time as the pressure of nitrogen gas from the bulk supply drops below, for example, 400 psi so as to shut off the supply of drive air to the booster 26 through the internal booster valve means.

Valve 78 is controlled by a pilot actuator 86 which is actuated by nitrogen pressure delivered to the actuator via a conduit 88 and acts in response to nitrogen pressure in conduit 88 in excess of the selected boost pressure (for example, 12,000 psi) to close valve 78 and shut off the supply of drive air to the booster through the internal booster valve means. Valve 78 includes bias means which are set to open valve 78 to recycle the booster.

High pressure storage system 30 includes a safety relief valve 89 set to open, for example, at 13,000 psi; a high pressure storage container 90 in communication with the outlet of booster 26 via conduits 91 and 92; a filter 93; and a shut off valve 94 for venting the system for maintenance purposes.

Pressure control system 32 receives high pressure nitrogen from high pressure storage system 30 via conduit 91 and reduces the pressure of the nitrogen to a pressure suitable for injection into the mold or suitable for control purposes. Pressure control system 32 includes a pressure regulator 95, a pressure regulator 96, a pressure regulator 97, a pressure regulator 98, a pressure regulator 147, and a pressure regulator 200. The pressure regulators are suitably adjustable to cover a broad pressure range, for example 500–9,000 psi.

Pressure regulator 95 is interposed in a conduit 99 and may be set, for example, to reduce the 12,000 psi output from high pressure storage container 90 to 1,000 psi. Conduit 99 extends from conduit 91 to gas injection conduit Pressure regulator 96 is interposed in a conduit 100 and may be set, for example, to reduce the 12,000 psi gas from high pressure storage container 90 to 6,000 psi. Conduit 100 extends from conduit 91 to gas injection conduit 40 and includes a shut off valve 107.

Pressure regulator 97 is interposed in a conduit 101 and may be set, for example, to reduce the 12,000 psi gas from high pressure storage container 90 to 6,000 psi. Conduit 101 extends from conduit 91 to conduit 100 and thence via conduit 100 to gas injection conduit 40.

Pressure regulator 98 is interposed in a conduit 102 and may be set for example to reduce the 12,000 psi gas from high pressure storage container 90 to 3,000 psi. Conduit 102 extends from conduit 91 to conduit 101 and thence via conduits 101 and 100 to gas injection conduit 40.

Pressure regulator 147 is interposed in a conduit 148 and may be set for example to reduce the 12,000 psi gas from high pressure storage container 90 to 5,500 psi. Conduit 148 extends from conduit 91 to gas storage system 34.

Gas storage system 34 includes a plurality of gas storage containers 103, 104, 105, and 106 of various sizes each connected to conduit 100 by shut off valves 108. The volumes of containers 103 and 104 are not variable and the volume of container 104 is significantly greater than the volume of container 103. The volume of container 105 may be varied in a pressure balancing manner in which an internal piston 105a moves selectively up and down within the container in response to differential pressures applied to the top and bottom of the piston. Specifically, the top of the piston is exposed to the pressure in conduit 100 from pressure regulator 96 and the bottom of the piston is exposed to the pressure in conduit 148 from pressure regulator 147. A shut off valve 210 and check valve 212 are provided in conduit 148 for set up and pressure balance purposes.

A two-way gas pilot valve 120 is provided in conduit 100 upstream of supplemental gas storage system 34. A conduit 113 communicates at its one end with conduit 100 upstream of valve 120 and at its other end with conduit 100 downstream of supplemental gas storage system 34. Conduit 113 thus bypasses supplemental gas storage system 34 so that gas from pressure control system 32 may be delivered directly to gas injection conduit 40, bypassing supplemental gas storage system 34, in those molding applications where it is not desired to utilize a supplemental gas storage system 34. A two-way gas pilot valve 123 in bypass conduit 113 controls the flow of gas through conduit 113.

Pressure regulator 95 communicates relatively low gas pressure to the nozzle 10 to prevent blockage of the gas passageway in the relatively small gas orifice in the nozzle during resin injection.

Pressure regulator 98 precharges the supplemental gas storage system 34 or bypasses the supplemental gas storage system 34 for direct gas injection to the injection nozzle.

Pressure regulator 96 precharges the supplemental gas storage system 34 at a higher pressure than pressure regulator 98 such that the gas may be delivered from the supplemental gas storage system 34 followed by gas delivery via bypass conduit 113.

Pressure regulator 97 delivers gas via bypass conduit 113 at an increased pressure, higher than pressure regulator 98.

Pressure regulator 200 is set to deliver gas from pressure regulator 97 in response to the setting of the pressure reduction when the gas is delivered from the supplemental gas storage system.

Pressure regulator 147 is used in combination with pressure regulator 96 to precharge storage container 105.

Storage container 105 may be precharged to deliver gas with a minor or major pressure drop. For a minor pressure drop, pressure regulator 96 is set slightly above pressure regulator 147. In this way the piston 105a will travel a relatively short distance before a pressure balance is achieved. For a major pressure drop, pressure regulator 96 is set significantly higher than pressure regulator 147. In this way the piston 105 will travel a relatively long distance before a pressure balance is achieved. For minor pressure differentials the piston 105a will bottom out during gas injection. For major pressure differentials piston 105a may or may not bottom out, depending on its use with other containers. The size of the storage containers are dependent on the molding applications to achieve the desired pressures. For this reason, additional containers or large containers may be added to cover extreme requirements. In any event, the gas storage system can be precisely set for the pressure requirement in a specific application.

It is understood that the volume of gas to be delivered to the mold is relatively fixed for a specific application and the pressures required are suitably adjustable to achieve the desired quality product. In addition, the gas is delivered at a relatively high rate of speed and for this reason it is difficult to control the timing of the pressure requirements. The invention apparatus is selectively operative to respond to the pressure requirements in self-executing manner.

Typically, valve 120 is opened to precharge the supplemental gas storage system 34 and is then closed. Bypass valve 123 may remain open provided the precharged pressure is, for example, higher than the setting of pressure regulator 98.

Container 106 is also of variable volume and includes a screw 109 driving a piston 110 so as to selectively control and vary the volume 111 defined within the container in response to selective rotation of screw 109 by a crank 112.

The supplemental gas storage system 34 may be suitably controlled to deliver the gas at the desired higher and lower pressures for precise gas assisted molding control.

Pilot operated gas control system 36 includes a conduit 115 connected to conduit 68 of bulk supply system 24; a regulator 116 set, for example, to reduce the bulk supply pressure of 400 psi to 150 psi; a conduit 117 communicating with the output of pressure regulator 116; a shut off valve 114 in conduit 117; a conduit 118 communicating with the pilot actuator 119 of two-way normally closed gas pilot valve 120; a conduit 121 communicating with the pilot actuator 122 of two-way normally closed gas pilot valve 123; a conduit 124 communicating with the pilot actuator 125 of a two-way normally closed pilot valve 126 positioned in conduit 100 and in communication with gas injection conduit 40; a conduit 127 communicating with the pilot actuator 128 of a two-way normally closed gas pilot valve 129 positioned in a conduit 130 connected to conduit 100; a conduit 131 communicating with an pilot actuator 132 of a two-way normally closed gas pilot valve 133 positioned in a vent conduit 134 connected to conduit 100; a conduit 135 connected to conduit 117 and communicating with the pilot actuator 136 of a two-way normally closed pilot valve 137 positioned in conduit 99; a conduit 138 connected to conduit 135 and communicating with the pilot actuator 139 of a two-way normally open gas pilot valve 140 positioned in conduit 102; a conduit 141 connected to conduit 135 and communicating with the pilot actuator 142 of a two-way normally closed gas pilot valve 143 positioned in conduit 101; and a conduit 144 connected to conduit 135 and communicating with the pilot actuator 145 of a two-way normally closed gas pilot valve 146 positioned in conduit 100.

The invention apparatus further includes a flow control valve 156 in conduit 110; an adjustable relief valve 157 in conduit 130 upstream of valve 129; a flow control valve 158 in conduit 100 downstream of valve 129; a flow control valve 159 in vent conduit 134 downstream of valve 133; and a pressure gage 160 in conduit 100. Flow control valves 156, 158, and 159 are utilized to control the flow rate of the gas during injection and during subsequent pressure reductions; relief valve 157 functions to adjustably set the desired reduction and hold pressure within the mold; and pressure gage 160 functions to monitor the gas pressure during the various aspects of the molding cycle.

Venting lines 130 and 134 may be connected by suitable apparatus to bulk storage containers to recover a portion of the gas utilized during the process. Although the gas usage is relatively minor and inexpensive, economies of operation can be realized by recovering at least some of the gas utilized in the gas assisted injection molding operation.

Control system 38 includes a control panel 161; a three-way solenoid operated control valve 162 positioned in conduit 118 and connected to control panel 161 via a lead 164; a three-way solenoid operated control valve 166 positioned in conduit 121 and connected to control panel 161 via a lead 168; a three-way solenoid operated control valve 170 positioned in conduit 124 and connected to control panel 161 via a lead 172; a three-way solenoid operated control valve 174 positioned in conduit 127 and connected to control panel 161 via a lead 176; a three-way solenoid operated control valve 178 positioned in conduit 131 and connected to control panel 161 via a lead 180; a three-way solenoid operated control valve 181 positioned in conduit 138 and connected to control panel 161 via a lead 182; a three-way solenoid operated control valve 183 positioned in conduit 141 and connected to control panel 161 via a lead 184 connecting to lead 182; a three-way solenoid operated control valve 185 positioned in conduit 144 and connected to control panel 116 via a lead 186 connected to lead 184; and a three-way solenoid operated control valve 187 positioned in conduit 135 and connected to control panel 161 via a lead 188 connected to lead 186.

Control panel 161 contains various selector switches, timers, push buttons, and interface signals with the molding machine to carry out the methodologies of the invention. Control panel 161 includes automatic and manual modes for set up of process and production cycling. The timers control the precise sequence of events.

In addition, the control panel contains selections wherein the gas is delivered through conduit 40 at various pressures in response to the pressures contained in conduit 100 (self-executing).

It will be understood that the control panel receives signals from the molding machine such that the gas can be introduced at a time prior to the completion of resin injection, or at a time after the completion of resin injection. The event is fully adjustable to cover the wide variety of molding applications and resin materials.

Injection conduit 40 is connected at one end via a coupling 190 to conduit 100 and via a coupling 192 to conduit 99, and is connected at its other end to an internal passage 40a (FIG. 19) in injection nozzle 10 so as to allow the introduction of nitrogen gas into the nozzle for discharge through central aperture 25 to provide gas assist to the molding operation in the manner previously described. Alternatively, line 40 may be connected at any other point in the mold in accordance with known gas assisted molding techniques.

The described apparatus utilizes commercially and readily available components. For example, the pressure regulators may be of the type available from Tescom of Elk River, Minnesota as Part No. 26-1000; the two-way air pilot valves may be of the type available from Swagelok of Solon, Ohio as Part No. SS-445-FP-C; the three-way solenoid operated control valves may be, for example, of the type available from Automatic Switch Co. of Florham Park, N.J. as Part No. 8321A1.

Operation

In operation, nitrogen gas is delivered from the bulk supply 24 to the regulator 46 at a stored pressure which may, for example, range from 2500 psi to 400 psi with the pressure dropping as the nitrogen supply is used up. Regulator 46 functions to reduce the pressure and maintain the pressure at 400 psi for delivery to the inlet of the booster 26 wherein the nitrogen pressure is boosted in two stages and in known manner to a selected value of, for example, 12,000 psi at booster outlet 26c. The booster is driven by compressed air from air supply 54 and pilot air from pilot air system 70 is utilized via valve 74 to shut off the drive air supply if the pressure of the gas being delivered to the booster drops below 400 psi (indicating a depletion of the supply of nitrogen in the bulk container 24 below the desired level) and via valve 78 to shut off the drive air if the pressure of the nitrogen leaving the booster exceeds the selected 12,000 psi. The pressure switch 50, set above 400 psi, provides a warning signal that the bulk supply will need to be replenished.

The high pressure nitrogen leaving the booster is stored in high pressure storage container 90 and is delivered to the inlet of pressure control system 32 where the pressure is reduced to a selected value for delivery to the injection molding apparatus.

The path or manner in which the nitrogen is delivered to the mold will depend upon the particulars of the contemplated molding operation. More specifically, the nitrogen may be delivered to the mold from one or more of the regulators of the pressure control system 32, from one or more of the storage containers of the supplemental gas storage system 34, or in combination form utilizing nitrogen from the pressure control system 32 as well as from the supplemental gas storage system 34.

In any event, whether the nitrogen is delivered to the mold from one of the regulators of the pressure control system 32, from one of the containers of the supplemental gas storage system 34, or as a combination of both systems, the gas is delivered to the gas injection nozzle and thereby to the mold at a pressure that is at all times lower than the pressure of the gas in the high pressure storage container 90 and the gas pressure in the mold during the subsequent resin displacement, cooling and venting operations is also at all times lower than the pressure of the gas in the high pressure storage container 90. The pressure of the gas may thus be carefully and precisely controlled during the entire injection molding process without regard to the high storage pressure and independently of the high storage pressure.

The control means of the invention allows the gas pressure within the mold, following the initial injection of gas into the mold and prior to the venting of the gas from the mold, to be selectively increased, decreased or held substantially constant, depending upon the particular requirements of the molding operation. The pressure may be increased during or after resin displacement, in self executing manner or by control means. The invention control means thus provides an almost unlimited number of gas pressure profiles within the mold with each particular profile being suitably tailored to the particular molding operation being undertaken. FIGS. 2-17 illustrate 16 gas pressure profiles that are possible using the invention control means and it will be understood that the 16 profiles are merely exemplary and that many other profiles are possible utilizing the invention control means.

Figure 2:
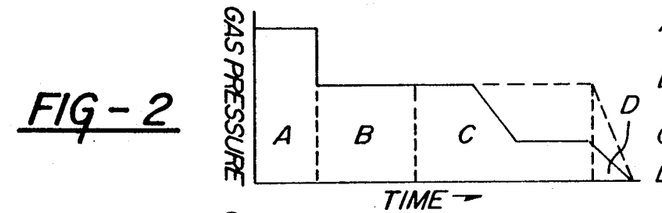
FIGS. 2-17 are profile graphs illustrating the steps in various methodologies that may be practiced according to the invention.

In the gas pressure profile illustrated in FIG. 2, the gas is injected at a relatively constant pressure to displace the resin in the mold whereafter the gas pressure is reduced to a lower level, whereafter the gas pressure is held at the lower level during the resin cooling cycle, whereafter the gas pressure is vented and the mold is opened to remove the molded part.

The gas pressure profile of FIG. 2 is utilized in a molding situation where it is desired to provide a relatively constant pressure to displace the resin through the gate, complete the resin displacement without breaking through the resin, and pack the resin to achieve the quality surface on the part and wherein it is desired to thereafter lower the gas pressure to reduce differential internal pressure in the article during cooling.

The gas pressure profile of FIG. 2 is achieved by delivering gas from pressure regulator 98 via conduits 101, 100, 113 and 100, by thereafter lowering the gas pressure in the mold utilizing valve 157, and by thereafter venting the gas from the mold utilizing valve 134 (all of the profiles illustrated in FIGS. 2–17 include the concluding steps of lowering the gas pressure during the cooling cycle, holding the gas pressure, and then venting the gas pressure and in each profile these steps are achieved utilizing the pressure relief valve 157 and thereafter the vent valve 134. Therefor, these concluding steps will not be separately described with respect to each profile).

In the modification to the gas pressure profile of FIG. 2, as seen in dash lines in FIG. 2, the gas pressure is held substantially constant during the cooling cycle and prior to the venting operation.

This modified profile would be utilized in situations where higher pressure is required during the cooling cycle to achieve a particular quality surface and is achieved simply by eliminating the step of lowering the gas pressure utilizing valve 157. This same modified profile may be utilized in any of the profiles shown in FIGS. 2–17 (as seen in dash lines in each profile) and is achieved in each case by eliminating the step of lowering the gas pressure utilizing valve 157.

Figure 3:
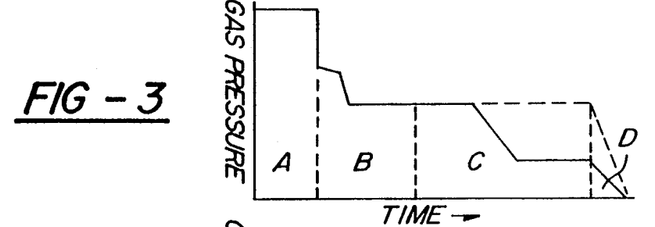

The gas pressure profile illustrated in FIG. 3 is generally similar to the gas pressure profile of FIG. 2 with the exception that the gas is initially injected into the mold at a higher pressure than in the FIG. 2 profile to displace a portion of the resin whereafter, during the remainder of the resin displacement portion of the cycle, the gas pressure is reduced to the initial injection pressure of the FIG. 2 profile, whereafter the remainder of the profile is the same as the FIG. 2 profile.

This gas pressure profile is utilized in a molding situation wherein a higher pressure is required to displace the resin through the gate but wherein the pressure must then be lowered to prevent the gas from breaking through the resin. This is very advantageous when a small gate, such as a subgate, is utilized.

The gas pressure profile of FIG. 3 is achieved by precharging container 105 for a minor pressure drop and at a pressure higher than pressure regulator 98. The gas is delivered from container 105 and then from pressure regulator 98 via the bypass 113 in self executing manner.

Figure 4:
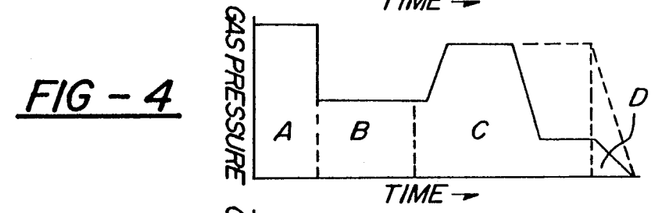

In the gas pressure profile illustrated in FIG. 4, the gas is injected at a relatively constant pressure to displace the resin in the mold whereafter the gas pressure is increased to a higher pressure, whereafter the gas pressure is held at the higher pressure for a portion of the cooling cycle.

This gas pressure profile is utilized in a molding situation where a higher pressure than in the FIG. 2 profile is required to pack the resin to achieve the quality surface.

The gas pressure profile of FIG. 4 is achieved by setting pressure regulator 97 to a higher pressure than pressure regulator 98. Gas is delivered from pressure regulator 98 via the bypass 113 and then from pressure regulator 97 via the bypass.

Figure 5:
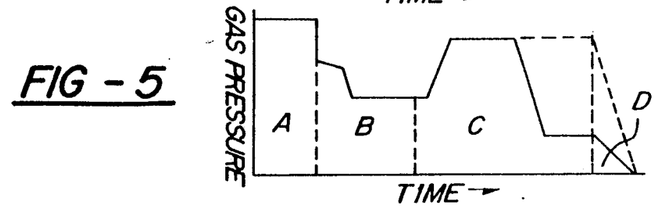

The gas pressure profile of FIG. 5 is generally similar to the gas pressure profile of FIG. 4 with the exception that the gas is introduced into the mold at an initial pressure that is higher than the initial pressure of FIG. 4 and generally similar to the initial pressure of FIG. 3.

This gas pressure profile is utilized in a molding situation where a higher pressure is required to displace the resin through the gate, a lower pressure is required to prevent the gas from breaking through the resin, and a higher pack pressure is required to achieve a quality surface.

The gas pressure profile of FIG. 5 is achieved by precharging container 105 for a minor pressure drop and at a pressure higher than pressure regulator 98. Pressure regulator 97 is set higher than pressure regulator 98. Gas is delivered from container 105, then from pressure regulator 98 via the bypass in self executing manner, and then from pressure regulator 97 via the bypass.

Figure 6:
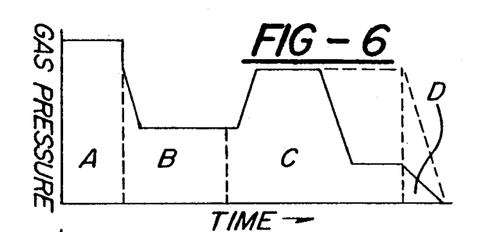

The gas pressure profile of FIG. 6 is generally similar to the gas pressure profile of FIG. 4 with the exception that the gas is initially injected into the mold at a pressure that is substantially equal to the pressure to which the gas is increased during the cooling cycle in FIG. 4 but drops steadily to the initial gas pressure of FIG. 4, whereafter the gas pressure profile is identical to the gas pressure profile of FIG. 4.

This gas pressure profile is utilized in molding situations generally similar to the molding situations of the FIG. 5 profile.

The gas pressure profile of FIG. 6 is achieved by utilizing the control means to trap the high pressure gas in bypass conduit 113. A storage container (not shown) of variable volume may be placed in conduit 113 for adjustment. Pressure regulator 97 is set higher than pressure regulator 98. Gas is delivered from the higher pressure to the lower pressure and continues to be delivered at the pressure regulator 98 setting via the bypass in self executing manner and then by control means from pressure regulator 97 via the bypass.

Figure 7:
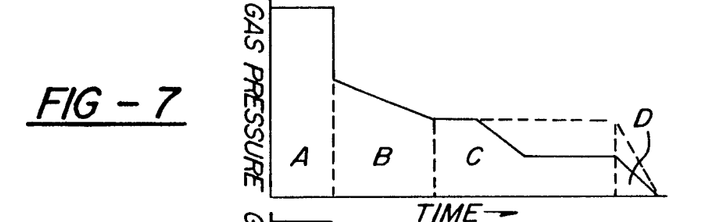

In the gas pressure profile illustrated in FIG. 7, the gas is injected into the mold at a relatively high pressure, whereafter it drops steadily and generally linearly during the resin displacement portion to a lower value, whereafter it is held at the lower value during the initial portion of the cooling cycle.

This gas pressure profile is utilized in a molding situation where a relatively high pressure is required for initial resin displacement yet a lowered constant pressure cannot complete resin displacement without breaking through the resin. In this profile the pressure is diminished to prevent breakthrough while continuing resin displacement.

The gas pressure profile of FIG. 7 is achieved by precharging the supplemental gas storage system from pressure regulator 98. The gas may be delivered from supplemental gas storage system 34 at a diminishing pressure.

Figure 8:
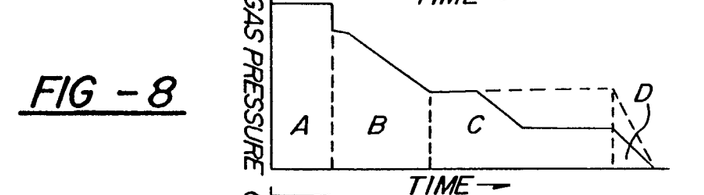

The gas pressure profile of FIG. 8 is generally similar to the gas pressure profile of FIG. 7 with the exception that gas initially droops slightly during the initial portion of the resin displacement cycle, and then drops steadily and generally linearly to a lower pressure.

This gas pressure profile is utilized in a molding situation where a sustained higher pressure is required to displace the resin through the gate than in the FIG. 7 profile.

The gas pressure profile of FIG. 8 is achieved by precharging container 105 for a minor pressure drop and further precharging at least one of the other containers in the supplemental gas storage system, both from pressure regulator 96. The gas is delivered from the supplemental gas storage system from the higher pressure to the lower pressure in self executing manner.

Figure 9:
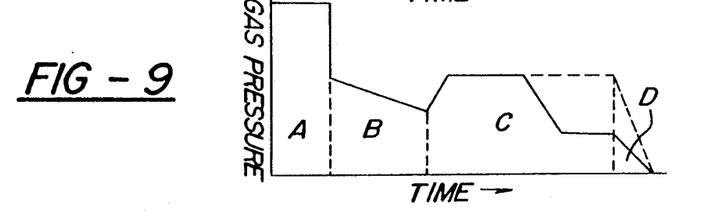

In the gas pressure profile illustrated in FIG. 9, the gas is injected into the mold at a relatively high pressure, the gas pressure thereafter declines steadily and generally linearly to a lower value during resin displacement, the gas pressure is thereafter increased to a pressure substantially equal to the initial injection pressure.

This gas pressure profile is utilized in a molding situation where a higher pack out pressure is required than in the FIG. 7 profile to achieve the quality surface desired.

The gas pressure profile of FIG. 9 is achieved by precharging the supplemental gas storage system 34 from pressure regulator 98. The gas is delivered from the gas storage system at a diminishing pressure and then by control means is delivered from pressure regulator 98 via bypass conduit 113.

Figure 10:
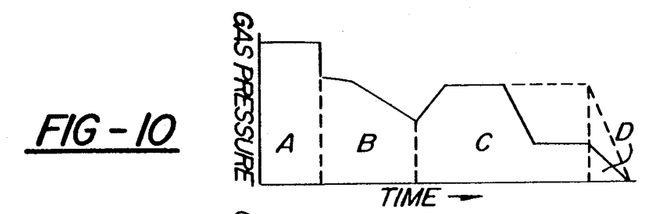

The gas pressure profile of FIG. 10 is generally similar to the gas pressure profile of FIG. 9 with the exception that the gas is initially injected into the mold at a sustaining pressure higher than the initial injection pressure of the FIG. 9 profile (generally corresponding to the corresponding profile portion of FIG. 8) whereafter it is reduced during the resin displacement portion to the level corresponding to the level of the FIG. 9 profile.

This pressure profile is utilized in a molding situation having requirements corresponding to a combination of the requirements of the FIGS. 8 and 9 profiles.

This profile is achieved by precharging container 105 for a minor pressure drop and further precharging at least one of the other containers in the supplemental gas storage system from pressure regulator 98. The gas is delivered from the supplemental gas storage system and then is delivered from pressure regulator 98 via bypass conduit 113.

In the gas pressure profile illustrated in FIG. 11, the gas pressure steadily declines in a generally linear manner as described with reference to FIG. 9 and is increased to a higher pressure greater than the initial injection pressure.

This gas pressure profile is utilized in a molding situation where the pack out pressure required is higher than the initial pressure to achieve the quality surface.

Figure 11:
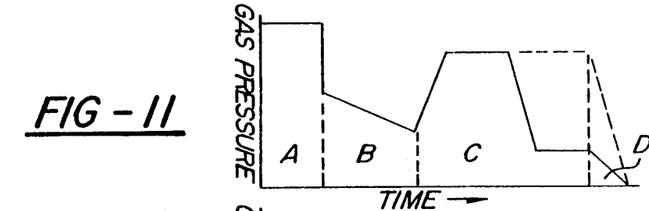

The gas pressure profile of FIG. 11 is achieved by precharging the supplemental gas storage system from pressure regulator 98. The gas is delivered from the supplemental gas storage system at a diminishing pressure and then is delivered from pressure regulator 97 via bypass conduit 113. The increased gas pressure from pressure regulator 97 may be introduced in response to the lower pressure through pressure regulator 200, set to open in response to the lowered pressure in conduit 100 via conduit 201, or in response to the opening of valve 143.

Figure 12:
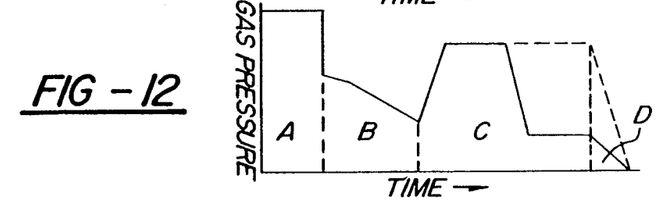

The gas pressure profile illustrated in FIG. 12 is generally similar to the gas pressure profile of FIG. 1 with the exception that the gas is injected into the mold at a higher sustaining initial pressure than in FIG. 11 (generally similar to the corresponding portion of the profile of FIG. 10), decays slightly during the initial portion of the resin displacement cycle and is thereafter reduced to the corresponding level in the FIG. 11 profile, whereafter the gas pressure profile is substantially identical to the FIG. 11 profile.

This gas pressure profile is utilized in a molding situations generally similar to the molding situation of the FIGS. 10 and 11 profiles and is achieved utilizing the means described with respect to the FIG. 10 profile except that the increase pressure is delivered from pressure regulator 97.

Figure 13:
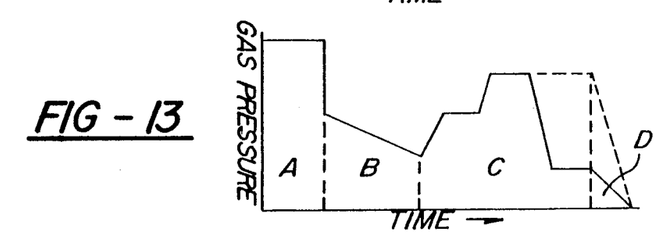

The gas pressure profile of FIG. 13 is similar to that of FIG. 9 except that it includes a further increase in gas pressure during the cooling cycle.

This gas pressure profile is utilized in a molding situation where the higher pressure is required to prevent degradation of the quality surface during resin cooling.

The gas pressure profile of FIG. 13 is achieved by utilizing the means described with respect to the FIG. 9 profile and further opening valve 143 to introduce high pressure gas via conduit 101 from pressure regulator 97 and into bypass conduit 113.

Figures 14, 15:
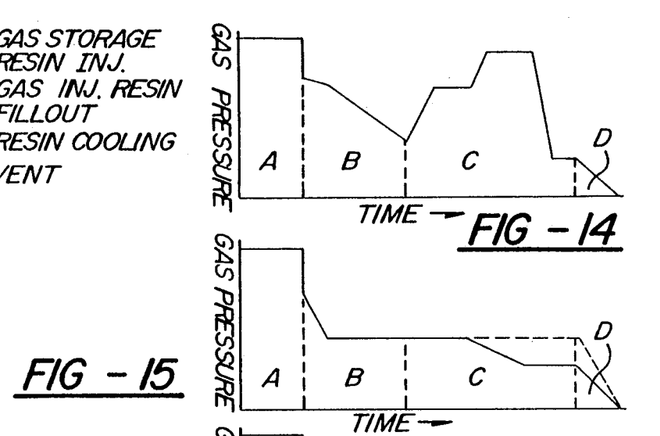

The gas pressure profile illustrated in FIG. 14 is generally similar to the gas pressure profile illustrated in FIG. 10 with a further increase in gas pressure during the cooling cycle.

This gas pressure profile is utilized in a molding situation where the higher pressure is required to prevent degradation of the quality surface during resin cooling.

The gas pressure profile of FIG. 14 is achieved by utilizing the means described with respect to the FIG. 10 profile and further opening valve 143 to introduce high pressure gas via conduit 101 from pressure regulator 97 and into conduit 113.

In the gas pressure profile illustrated in FIG. 15, the initial gas pressure is rapidly and generally linearly reduced to a lower gas pressure during the initial portion of the resin displacement cycle and the gas pressure is substantially held at the lowered value during the remainder of resin displacement and during the pack out portion of the cycle.

This gas pressure profile is utilized in a molding situation where a high initial pressure is required to initiate resin flow through the 9ate and a lower pressure is required to continue resin flow through the gate and wherein such lower pressure is continued to complete resin displacement without breakthrough of the resin.

The gas pressure profile of FIG. 15 is achieved by precharging the supplemental gas storage system 34 from pressure regulator 96 with pressure regulator 96 set higher than pressure regulator 98. Gas is delivered from the supplemental gas storage system at a diminishing pressure and is then delivered from pressure regulator 98 via the bypass 113 in self executing manner.

Figure 16:
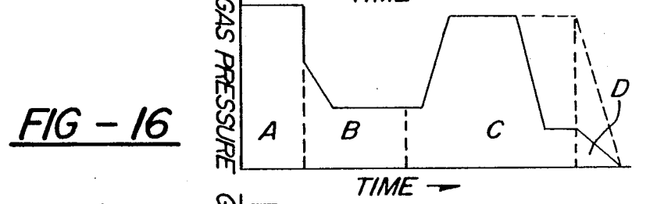

The gas pressure profile illustrated in FIG. 16 is generally similar to the gas pressure profile illustrated in FIG. 15 except that the gas pressure is increased for the pack out portion of the cycle.

This gas pressure profile is utilized in a molding situation where higher pack out pressure is required to achieve a quality surface.

The gas pressure profile of FIG. 16 is achieved by the means described with respect to the FIG. 15 pressure profile in combination with the further step of increasing the gas pressure via pressure regulator 97.

Figure 17:
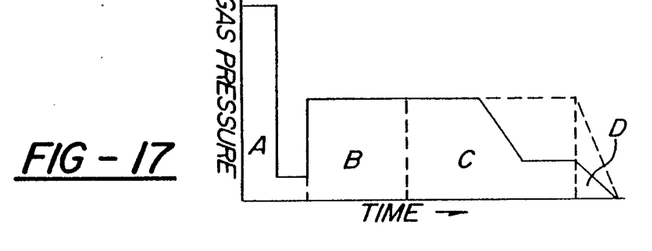

In the gas pressure profile of FIG. 17, the gas pressure is introduced into the nozzle 14 at a reduced pressure during the resin injection so as to preclude the entry of resin through aperture 25 and through passage 40a into injection conduit 40.

This step may be utilized in any molding situation where the resin injection pressure is sufficiently high upstream of the gate so as to tend to push plastic up into the injection conduit 40. This step, while illustrated in FIG. 17 as being utilized in association with the pressure profile of FIG. 1, may be utilized in association with any of the illustrated pressure profiles and, as indicated, is utilized in any situation where there is concern with respect to the resin being pushed back up into the injection conduit during the resin injection so as to block the gas passage in the nozzle and interfere with the subsequent injection of gas into the mold for gas assistance.

This initial step of providing low gas pressure to counteract any tendency of the resin to be pushed back up into the injection conduit is achieved by opening valve 137 to deliver gas to the nozzle at the setting of pressure regulator 95, via conduits 99 and 40.

Figure 18:
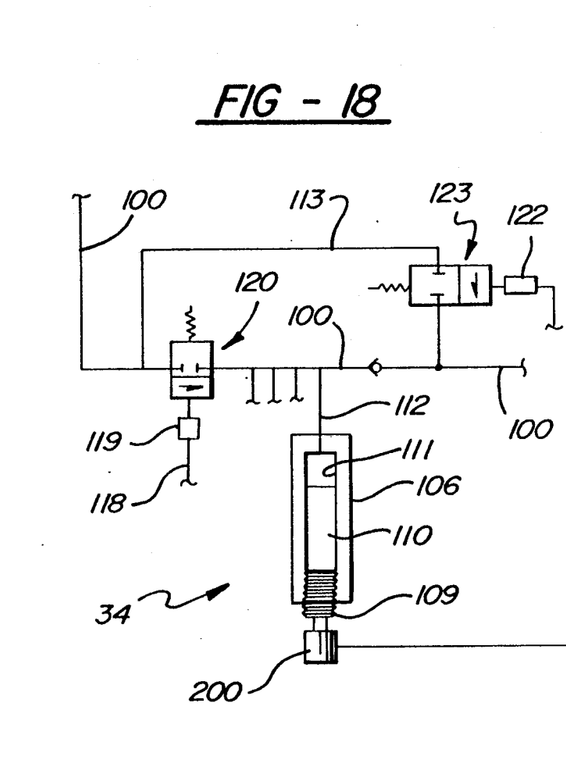
FIG. 18 is a fragmentary view of a modified form of the invention method and apparatus.

The modified form of the invention method and apparatus shown in FIG. 18 is identical to the method and apparatus shown in FIG. 1 with the exception that means are provided to selectively vary the volume of the container 106 of gas storage system 34 and/or the setting of pressure regulator 96 of pressure control system 32 in response to sensed conditions or parameters of the injection molding operation. For example, an electric motor device 200 may be provided to drive the screw 109 of container 106; an electric motor device 202 may be provided to drive regulator 96; a thermocouple 204 is positioned to sense the temperature of the resin in the nozzle 10; a further thermocouple 206 is positioned to sense the temperature of the resin in the mold cavity 18; and motors 200 and 202 and thermocouples 204 and 206 are connected respectively by leads 208, 210, 212 and 214 to a control panel 216 which functions to process the information received from thermocouples 204 and 206 and vary the position of piston 110 of container 106 and/or the setting of regulator 96 in response to the information provided via leads 212 and 214 from thermocouples 204 and 206.

For example, control panel 216 may be programmed in response to a sensed drop in temperature, either in the injection nozzle or in the mold, to increase the pressure setting of regulator 96 so as to provide a higher injection gas pressure to overcome the increased viscosity corresponding to the lower temperature. Alternatively, control panel 216 may function in response to the received lower temperature signal from thermocouple 204 and/or 206 to actuate motor 200 in a sense to increase the volume 111 defined within container 106 so as to provide an additional quantity of gas for injection in compensation for the increased viscosity represented by the temperature drop. Conversely, controller 216 may function in response to a sensed increase in temperature at thermocouple 204 and/or 206 to lower the setting of regulator 96 in compensation for the lower viscosity represented by the increased temperature in the mold and/or in the mold cavity, or motor 200 may be actuated in a sense to decrease the volume of chamber 111 in container 106, also in compensation for the lower viscosity represented by the sensed increased temperature.

With the method and apparatus of FIG. 18, the setting of pressure regulator 96 may be selectively varied in response to changes in the molding temperature so as to vary the pressure at which the gas is delivered to the mold via conduits 100, 113, and 40, bypassing fixed volume container 106, or in those situations where it is desired to utilize the fixed volume container to provide the gas to the mold, the setting of the pressure regulator 96 may be varied in response to sensed changes in the temperature at the mold so as to vary the pressure of gas delivered to the container 106; the volume setting of the container 110 may be varied, utilizing motor 106, in response to sensed temperature changes so as to vary the volume of gas delivered to the mold from the fixed volume container; or both the setting of regulator 96 and the volume defined by container 106 may be varied in response to the sensed temperature changes so as to vary both the pressure and the volume of the gas delivered to the mold. Control panel 216, depending upon the characteristics of the molding environment, may comprise a portion of or be integrated with control panel 161; may comprise a portion of or be integrated with the controls of the injection molding machine; or may comprise a stand-alone control panel.

Although the method and apparatus of FIG. 18 have been described utilizing temperature as the sensed condition or parameter of the resin, other conditions or parameters of the resin, such as resin pressure, may also be sensed as, for example, by pressure transducers associated with the injection nozzle and/or the mold cavity.

The described methods and apparatus will be seen to provide many advantages with respect to gas assisted injection molding. Specifically, the described system isolates the high stored gas pressure from the pressure of the injected gas so as to allow the pressure of the injected gas to be controlled selectively and independently of the high pressure stored gas; the selective control of the gas pressure within the mold whereby the gas pressure within the mold may be selectively increased, decreased, or held substantially constant allows the gas pressure profile within the mold to be selectively crafted and configured to match the particular molding requirements; the different molding techniques offered by the invention apparatus as well as the selected control of the various steps of the method techniques allows the invention apparatus to be utilized to process a wide variety of plastic articles, molds, and resin materials in common use; the invention apparatus utilizes standard commercially available components so as to minimize the initial cost of the apparatus and minimize maintenance costs; the invention method and apparatus avoids the use of oil as the drive means so as to avoid the system failure problems associated with mixing of the drive oil with the nitrogen gas; and the invention method and apparatus in general facilitate the greater utilization of gas assisted injection molding techniques and the many benefits that accrue from the utilization of gas assisted injection molding.

Whereas preferred embodiments of the invention have been illustrated and described in detail, it will be apparent that various changes may be made in the disclosed embodiments without departing from the scope or spirit of the invention.

I claim:

1. A method of providing gas assistance to a resin injection molding process of the type in which hot resin is injected into a mold cavity and gas is injected into the resin to displace the resin in the mold cavity, means are provided to selectively control the pressure of the gas in the mold, the gas is stored at a first storage pressure as determined by the control means, the gas at the first storage pressure is reduced to a second lower pressure as determined by said control means, and the gas is injected into the mold at said second lower pressure to displace the resin in the mold cavity, the resin cools, the gas is vented, and the mold is opened to remove the molded part, the improvement wherein following the injection of the gas into the mold at said second lower pressure the gas pressure in the mold is increased to a third pressure as determined by said control means.

2. A method of providing gas assistance to a resin injection molding process of the type in which hot resin is injected into a mold, gas is injected into the mold to displace a portion of the resin in the mold, the resin cools, the gas is vented and the mold is opened to remove the molded part, a supply of stored as is provided, the gas is injected into the mold to displace the resin in the mold cavity at a pressure that is at all times during the gas injection cycle substantially below the pressure of the stored gas supply, the improvement wherein, following the initial injection of the gas into the mold and prior to the venting of the gas from the mold, the gas pressure within the mold is selectively increased, decreased, or held substantially constant depending upon the particular requirements of the molding process.

3. A method according to claim 1 wherein the gas pressure is substantially maintained at said second lower pressure during the displacement of the resin and prior to the increase in gas pressure to said third pressure.

4. A method according to claim 1 wherein the gas pressure is reduced from said second lower pressure to a fourth lower pressure during the displacement of the resin and prior to the increase in gas pressure to said third pressure.

5. A method according to claim 4 wherein the gas pressure is increased in response to said fourth lower pressure.

6. A method according to claim 1 wherein the gas pressure is increased during the displacement of the resin.

7. A method according to claim 1 wherein the gas pressure is held at substantially the increased gas pressure during resin cooling.

8. A method according to claim 1 wherein high pressure gas storage means are provided which are operative to store gas at a pressure that is at all times higher than the gas pressure communicated to the mold.

9. A method according to claim 1 wherein the gas pressure is reduced during resin cooling.

10. A method according to claim 4 wherein the increased gas pressure substantially equals the said second pressure.

11. A method according to claim 4 wherein the increased gas pressure is less than said second pressure.

12. A method according to claim 4 wherein the increased gas pressure is greater than the said second pressure.

13. A method according to claim 1 wherein the increased gas pressure is subsequently further increased.

14. A method according to claim 4 wherein the gas pressure is reduced to said lower gas pressure during an initial portion of the resin displacement and is thereafter held at substantially said lower gas pressure during a subsequent portion of the resin displacement.

15. A method according to claim 2 wherein a plurality of pressure control means set at varying pressures are interposed between the stored gas supply and the gas injection means, and each of the pressure control means is selectably communicated with the gas injection means so as to selectively vary the gas pressure in the mold.

16. An apparatus for providing gas assistance to a resin injection molding process of the type in which hot resin is injected into a mold cavity, gas is injected into the mold to displace a portion of the resin in the mold, the resin cools, the gas is vented and the mold is opened to remove the molded part, the improvement wherein a supply of stored gas is provided and the apparatus includes control means which are operative to inject gas into the mold to fill out the mold cavity at a pressure that is at all times during the gas injection cycle substantially below the pressure of the stored gas supply and which are further operative, following the initial injection of gas into the mold and prior to the venting of the gas from the mold, to selectively increase the gas pressure within the mold, decrease the gas pressure within the mold, or maintain the gas pressure within the mold at a particular value.

17. An apparatus according to claim 16 wherein the control means includes a plurality of pressure control means set at varying pressures and interposed between the stored gas supply and gas injection means, and means operative to selectively communicate each of said pressure control means with said gas injection means so as to selectively deliver gas at varying pressures to said mold.

18. An apparatus according to claim 17 wherein said stored gas supply is maintained at a pressure at all times higher than the pressure communicated to said gas injection means.

19. An apparatus according to claim 17 wherein said control means further includes a gas storage system including at least one gas storage container interposed between at least one of said pressure control means and said gas injection means.

20. An apparatus according to claim 19 wherein said control means is operative to selectively deliver gas to said gas injection means either directly from one of said pressure control means, bypassing said storage container, or from said storage container.

21. An apparatus according to claim 19 wherein said gas storage system includes a plurality of storage containers of various volumes and said control means is operative to selectively communicate each of said storage containers with said gas injection means so as to deliver gas to the mold at the desired pressures.

22. An apparatus according to claim 17 wherein at least one of said pressure control means communicates directly with said gas injection means.

23. An apparatus according to claim 17 wherein one of said pressure control means is set at a relatively high pressure, another of said pressure control means is set at a relatively low pressure, and said control means is further operative to selectively deliver gas to said gas injection means from said one pressure control means at said relatively high pressure and from said other pressure control means at said relatively low pressure.

24. An apparatus according to claim 16 wherein said control means is operative, following the injection of gas into the mold, to maintain the gas pressure at or below the injection pressure during resin cooling and prior to venting.

25. An apparatus according to claim 16 wherein said control means is operative, following the initial injection of gas into the mold, to boost the gas pressure to a higher pressure and to thereafter, during resin cooling and prior to venting, maintain the gas pressure at or below such higher pressure.

26. An apparatus according to claim 16 wherein said control means is operative following the initial injection of gas into the mold to allow the gas pressure to diminish to a reduced pressure and to thereafter, during resin cooling and prior to venting, to maintain the gas pressure at or below the reduced pressure.

27. An apparatus according to claim 16 wherein said control means is operative, following the initial injection of gas into the mold, to allow the gas pressure to diminish to a reduced pressure, to thereafter boost the gas pressure to a higher pressure substantially equal to the initial gas injection pressure, and to thereafter maintain the gas pressure at or below the higher pressure.

28. An apparatus according to claim 16, wherein said control means is operative, following the initial injection of gas into the mold, to allow the gas pressure to diminish to a reduced pressure, to thereafter boost the gas pressure to a higher pressure less than the initial gas injection pressure, and to thereafter maintain the gas pressure at or below the higher pressure.

29. An apparatus according to claim 16 wherein said control means is operative, following the initial injection of gas into the mold, to allow the gas pressure to diminish to a reduced pressure, to thereafter boost the gas pressure to a pressure higher than the initial gas injection pressure, and to thereafter maintain the gas pressure at or below the higher pressure.

30. An apparatus according to claim 16 wherein said control means is operative, following the initial injection of gas into the mold, to allow the gas pressure to diminish to a reduced pressure, to thereafter boost the gas pressure to a higher pressure substantially equal to the initial gas injection pressure, to thereafter further boost the gas pressure to a yet higher pressure higher than the initial gas injection pressure, and to thereafter maintain the gas pressure at or below the yet higher pressure.

31. An apparatus according to claim 16 wherein said control means is operative, following the initial injection of gas into the mold, to allow the gas pressure to diminish to a reduced pressure, to thereafter maintain the gas pressure substantially at the reduced pressure to displace a portion of the resin in the mold, and to thereafter maintain the gas pressure at or below the reduced pressure.

32. An apparatus according to claim 16 wherein said control means is operative, following the initial injection of gas into the mold, to allow the gas pressure to diminish to a reduced pressure, to thereafter maintain the gas pressure substantially at the reduced pressure to displace a portion of the resin in the mold, to thereafter boost the gas pressure to a higher pressure, and to thereafter maintain the gas pressure at or below the higher pressure.

33. An apparatus according to claim 19 wherein the stored gas supply has a volume greater than said gas storage system.

34. An apparatus according to claim 19 wherein said at least one storage container is a fixed volume container.

35. An apparatus according to claim 17 wherein the control means further includes a booster system operative to pressurize the stored gas supply.

36. An apparatus according to claim 19 wherein said at least one storage container is of a fixed volume and said fixed volume is selectively variable.

37. An apparatus according to claim 36 wherein the fixed volume is selectively variable by mechanical means.

38. An apparatus according to claim 36 wherein the fixed volume is selectively variable by pressure control means.

39. An apparatus according to claim 38 wherein said fixed volume is substantially delivered during gas injection.

40. An apparatus according to claim 39 wherein said fixed volume is substantially delivered at the pressure set by said pressure control means.

41. An apparatus according to claim 21 wherein at least one of the fixed volume storage containers is selectively variable.

42. A method according to claim 1 wherein the gas is injected into the mold from the first storage pressure.

43. An apparatus according to claim 19 wherein said apparatus further includes means for filling said gas storage container to a desired pressure and means for delivering gas from said gas storage container to said gas injection means.

44. An apparatus according to claim 43 wherein said control means is selectively operative to deliver gas to the mold rom said high pressure gas storage means, from said gas storage container, or from both.

45. A method according to claim 2 wherein gas pressure is communicated to a gas aperture in communication with the resin in the mold prior to the gas being injected into the mold to displace the resin in the mold.

46. An apparatus for providing gas assistance in a resin injection molding process of the type in which hot resin is injected into a mold, gas is injected into the mold to displace a portion of the resin in the mold, the resin cools in the mold, the gas is vented from the mold, and the mold is opened to remove the molded part, the improvement wherein the apparatus includes control means which are operative to store the gas at a first high pressure, to reduce the first storage pressure to a second lower pressure, to inject the gas into the mold at the second lower pressure, and to thereafter increase the gas pressure within the mold to a third pressure.

47. A gas assisted injection molding apparatus for use with an injection mold, said apparatus comprising:
 a mold;
 means for injecting resin into the mold;
 a source of gas;
 high pressure storage means for storing a supply of said gas at a first high pressure;
 pressure regulating means downstream of said high pressure storage means for reducing the gas pressure to second lower pressure;
 means operative to inject said gas at said second lower pressure into the mold; and
 control means operative when actuated to reduce the gas pressure to a third lower pressure corresponding to the setting of the control means.

48. An apparatus according to claim 47 wherein said control means is operative to substantially maintain said second lower pressure during gas injection.

49. An apparatus according to claim 47 wherein said control means is operative to reduce said gas pressure from said second to said third gas pressure during gas injection.

50. An apparatus according to claim 47 wherein said control means is operative to reduce the gas from said second gas pressure to a fourth gas pressure, higher than said third pressure, during gas injection and to thereafter reduced the gas pressure to said third gas pressure.

51. An apparatus according to claim 47 wherein said control means is further operative to hold the gas pressure substantially at said third lower pressure until the mold is vented.

52. An apparatus according to claim 47 wherein said control means is operative to maintain the pressure of the high pressure storage means at a pressure higher than the gas injection pressure during gas injection.

53. An apparatus according to claim 47 wherein said apparatus further includes means operative to store said gas at said second lower pressure prior to gas injection.

54. An apparatus according to claim 47 wherein said apparatus further includes means operative to boost the pressure of the source of gas for storage in said high pressure storage means.

55. An apparatus according to claim 47 wherein said control means includes a pressure relief valve selectively adjustably to determine the magnitude of said third lower pressure.

56. An apparatus according to claim 55 wherein said control means further includes a control valve cooperating with said relief valve and means for selectively opening said control valve to allow said relief valve to lower said gas pressure to said third lower pressure as determined by the setting of said relief valve.

57. An apparatus according to claim 55 wherein said control means further includes a flow valve cooperating with said relief valve for controlling the rate of gas flow through said relief valve.

58. An apparatus according to claim 51 wherein said control means further includes a control valve to vent the mold from said third lower pressure.

59. An apparatus according to claim 58 wherein said control means further includes a flow valve cooperating with said control valve for controlling the rate of gas flow through said control valve.

60. An apparatus according to claim 47 wherein said control means is further operative to maintain the high pressure storage pressure higher than said second pressure during the delivery of the gas to the mold.

61. An apparatus according to claim 47 wherein said operative means includes means for sensing a condition of the resin and means for varying the magnitude of said second pressure in response to sensed changes in said resin condition.

62. An apparatus according to claim 61 wherein said resin condition is the resin temperature and the means for sensing the condition of the resin comprises a temperature sensing device.

63. A gas assisted injection molding apparatus for use with an injection mold, said apparatus comprising:
 a mold;
 means for injecting resin into the mold;
 a source of gas;
 high pressure storage means for storing a supply of said gas at a first high pressure;
 pressure regulator means downstream of said high pressure storage means for reducing the gas pressure to a second lower pressure;
 a fixed volume storage system downstream of said pressure regulator means including at least one fixed volume storage container for storing a fixed volume of gas at said second pressure; and
 control means for delivering gas to the mold to assist in the injection molding process.

64. An apparatus according to claim 63 wherein said control means is operative selectively to deliver gas to the mold either directly from said pressure regulator, bypassing said fixed volume storage container, or from said fixed volume storage container.

65. An apparatus according to claim 63 wherein said control means is operative to deliver gas to the mold from said fixed volume storage container.

66. An apparatus according to claim 63 wherein said fixed volume storage system includes a plurality of fixed volume storage containers of various volumes so as to deliver gas to the mold in varying quantities depending on the fixed volume container employed.

67. An apparatus according to claim 63 wherein said fixed volume storage container is selectively adjustable to vary the fixed volume defined by the container so as to allow delivery of gas to the mold in varying quantities depending on the adjustment of the volume defined by the storage container.

68. Apparatus according to claim 63 wherein said control means further includes selectively adjustable means operative, following the deliver of gas to the mold, to thereafter lower the gas pressure in the mold to a third pressure, lower than said second pressure, corresponding to the setting of said selectively adjustable means.

69. An apparatus according to claim 68 wherein said selectively adjustable means includes an adjustable relief valve in communication with the mold so as to allow the relief valve setting to determine the magnitude of said third lower pressure.

70. An apparatus according to claim 63 wherein said apparatus further includes means to ensure that said first high pressure always remains at a value above said second lower pressure during the entire injection molding process.

71. An apparatus according to claim 69 wherein said apparatus further includes a control valve cooperating with said relief valve and means for selectively opening said control valve to allow said relief valve to lower said gas pressure to said third lower pressure as determined by the setting of said relief valve.

72. An apparatus according to claim 71 wherein said control means further includes a flow valve cooperating with said relief valve for controlling the rate of gas flow through said relief valve.

73. An apparatus according to claim 63 wherein said apparatus further includes means for sensing a condition of the resin and means for varying the setting of said pressure regulator means in response to sensed changes in said resin condition.

74. An apparatus according to claim 63 wherein said apparatus further includes means for sensing a condition of the resin and means for varying the magnitude of said fixed volume of gas in response to sensed changes in said resin condition.

75. An apparatus according to claim 67 wherein said apparatus further includes means for sensing a condition of the resin and means for selectively adjusting said fixed volume storage container in response to sensed changes in said resin condition.

76. An apparatus according to claim 75 wherein said apparatus further includes means for varying the setting of said pressure regulator in response to sensed changes in said resin condition.

* * * * *